(12) United States Patent
McEverett

(10) Patent No.: US 12,403,417 B2
(45) Date of Patent: Sep. 2, 2025

(54) IMMERSION BIOREACTOR DEVICE

(71) Applicant: John Banner McEverett, Hendersonville, NC (US)

(72) Inventor: John Banner McEverett, Hendersonville, NC (US)

( * ) Notice: Subject to any disclaimer, the term of this patent is extended or adjusted under 35 U.S.C. 154(b) by 409 days.

(21) Appl. No.: 17/833,464

(22) Filed: Jun. 6, 2022

(65) Prior Publication Data
US 2023/0055557 A1    Feb. 23, 2023

Related U.S. Application Data

(60) Provisional application No. 63/233,970, filed on Aug. 17, 2021.

(51) Int. Cl.
| | | |
|---|---|---|
| *B01D 36/00* | (2006.01) | |
| *B01D 29/01* | (2006.01) | |
| *B01D 29/96* | (2006.01) | |
| *B01D 35/30* | (2006.01) | |

(52) U.S. Cl.
CPC .......... *B01D 36/001* (2013.01); *B01D 29/01* (2013.01); *B01D 29/96* (2013.01); *B01D 35/30* (2013.01); *B01D 2201/4092* (2013.01)

(58) Field of Classification Search
CPC .................................................. A01G 9/0295
See application file for complete search history.

(56) References Cited

U.S. PATENT DOCUMENTS

| | | | | |
|---|---|---|---|---|
| 3,145,880 A | * | 8/1964 | Whatley | A47G 19/24 |
| | | | | 222/459 |
| 2011/0044567 A1 | * | 2/2011 | Barbaroux | B65D 90/205 |
| | | | | 383/105 |
| 2012/0028234 A1 | * | 2/2012 | Guertin | C12M 23/28 |
| | | | | 435/395 |

(Continued)

FOREIGN PATENT DOCUMENTS

KR    20160031709 A  *  3/2016

OTHER PUBLICATIONS

Mason Jar Life, Amazon.com product listing, with available for purchase date of Apr. 2020, printed from the web Sep. 24, 2024. (Year: 2020).*

*Primary Examiner* — Bradley R Spies
*Assistant Examiner* — Jeannie McDermott
(74) *Attorney, Agent, or Firm* — PATENTFILE, LLC; Bradley C. Fach; Steven R. Kick

(57) ABSTRACT

An immersion bioreactor device may include a vessel coupler, a first vessel, and a second vessel. The first vessel may include a first cavity and a first vessel aperture in fluid communication with the first cavity. The second vessel may include a second cavity and a second vessel aperture that may be in fluid communication with the second cavity. The vessel coupler may be configured to be removably coupled to the first and second vessels so that the first and second vessel apertures are in fluid communication with the vessel coupler. The vessel coupler may include a plate which may separate the vessel apertures from each other. One or more (Continued)

coupler apertures may be disposed in the plate, and the coupler apertures may enable fluid communication between the vessel apertures. Optionally, an adjustable vane disc may govern the fluid communication provided by the coupler apertures.

16 Claims, 6 Drawing Sheets

(56) References Cited

U.S. PATENT DOCUMENTS

| | | | |
|---|---|---|---|
| 2013/0071872 A1* | 3/2013 | Ho | C12M 33/04 |
| | | | 422/547 |
| 2016/0316957 A1* | 11/2016 | Tran | C02F 1/003 |
| 2017/0000289 A1* | 1/2017 | Feber | A23F 5/26 |
| 2020/0270559 A1* | 8/2020 | Macur | A23J 3/227 |

* cited by examiner

IMMERSION BIOREACTOR DEVICE

CROSS REFERENCE TO RELATED APPLICATIONS

This application claims priority to and the benefit of the filing date of U.S. Provisional Application No. 63/233,970, filed on Aug. 17, 2021, entitled "Immersion Bioreactor Device", which is hereby incorporated by reference in its entirety.

FIELD OF THE INVENTION

This patent specification relates to the field of immersion bioreactors. More specifically, this patent specification relates to an immersion bioreactor device which may be configured for the aseptic liquid culture of plants and for obtaining exudates from the plants.

BACKGROUND

Many individuals utilize bioreactors for the aseptic liquid culture of plants, for obtaining exudates from plants, for fermentation under controlled conditions, and for many other purposes. However, existing bioreactors are complex, are difficult to operate, and are expensive to produce. For example, existing bioreactors often require one or more pumps, in-line filters, fluid lines, gaseous lines, agitators, and control systems. For this reason, many users do not utilize their bioreactors as often as desired, and many potential users never end up buying one.

Therefore, a need exists for novel immersion bioreactor devices. A further need exists for novel immersion bioreactor devices which may be configured for the aseptic liquid culture of plants, obtaining exudates from plants, and for fermentation under controlled conditions, and for many other purposes. There is also a need for novel immersion bioreactor devices which are not complex, difficult to operate, or are expensive to produce.

BRIEF SUMMARY OF THE INVENTION

An immersion bioreactor device is provided which may be used for purposes that may include, the aseptic liquid culture of plants, obtaining exudates from plants, animal tissue culture processes, fermentation under controlled conditions, and many other purposes. In some embodiments, the device may include a vessel coupler and optionally a first vessel and a second vessel. A first vessel may include a first cavity and a first mouth forming a first vessel aperture in which the first vessel aperture is in fluid communication with the first cavity. A second vessel may comprise a second cavity and a second mouth forming a second vessel aperture in which the second vessel aperture is in fluid communication with the second cavity. The vessel coupler may be configured to be removably coupled to both the first vessel and second vessel, and the vessel coupler may have a plate positioned between a first sidewall and a second sidewall. The first sidewall may be configured to be removably coupled to the first mouth of the first vessel so that the first vessel aperture is in fluid communication with the plate, and the second sidewall may be configured to be removably coupled to the second mouth of the second vessel so that the second vessel aperture is also in fluid communication with the plate. One or more coupler apertures may be disposed in the plate, and the coupler apertures may enable fluid communication between the vessel apertures.

In further embodiments, the device may optionally include a vane disc that may govern the size of objects that may pass through the coupler apertures, preferably by being sized to prevent particles of a desired size from passing through between the vessels through the coupler apertures. A vane disc may be movably coupled to the plate or other element of the vessel coupler, and the vane disc may have one or more disc apertures that are movable relative to the one or more coupler apertures to govern the fluid communication provided by the coupler apertures, such as by moving the vane disc to align and un-align the disc apertures and coupler apertures to various degrees.

Numerous objects, features and advantages of the present invention will be readily apparent to those of ordinary skill in the art. It is an object of the present invention to provide an immersion bioreactor device which allows a user to be able to replace spent or change liquid media by simply swapping out the liquid side vessel with a new one without disturbing the plant side as opposed to existing bioreactor devices which require pumping, draining, disconnection of fluid lines and filters, etc.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
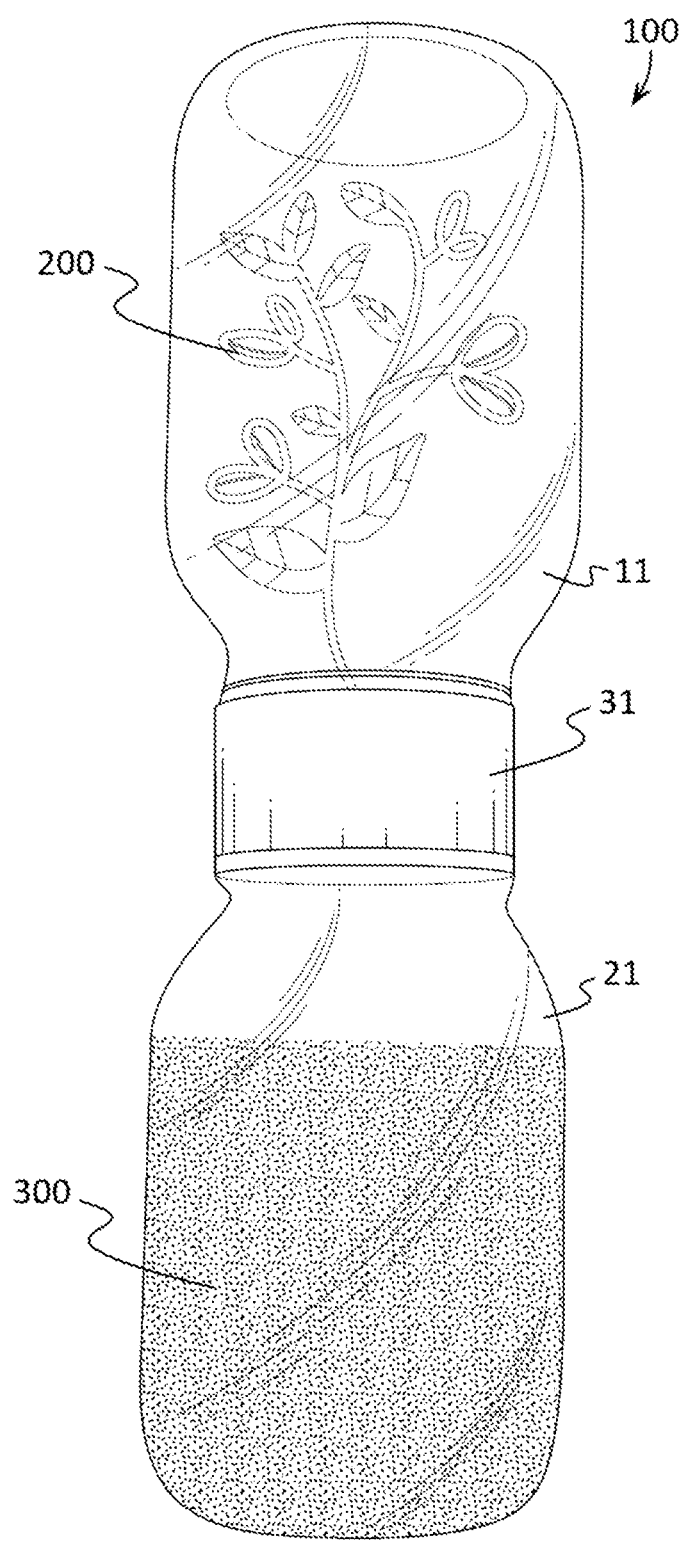
FIG. 1 depicts a perspective view of an example of an immersion bioreactor device according to various embodiments described herein.
Figure 2:
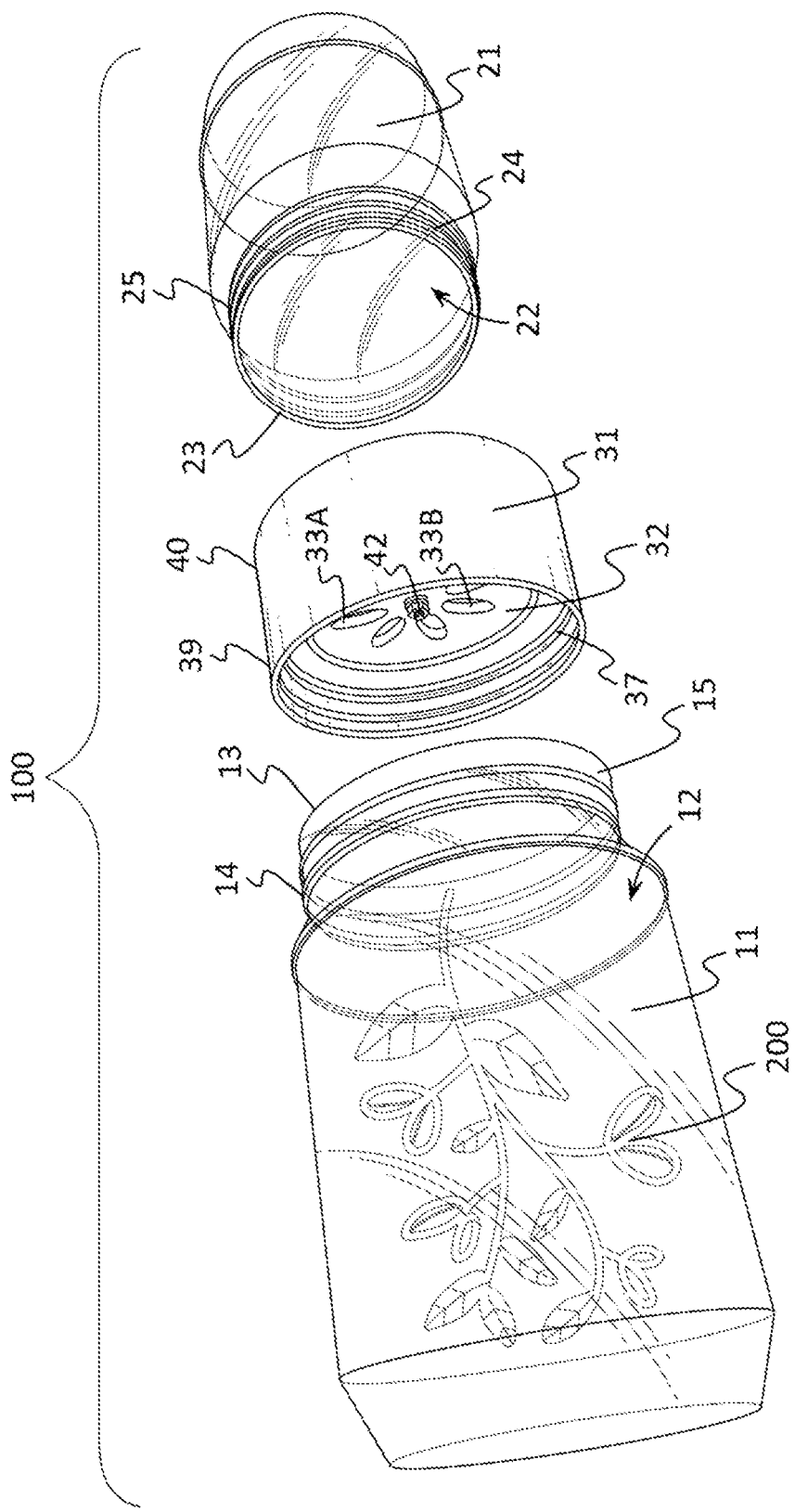
FIG. 2 illustrates the example immersion bioreactor device of FIG. 1 having a first and second vessel which are separated from a vessel coupler according to various embodiments described herein.
Figure 3:
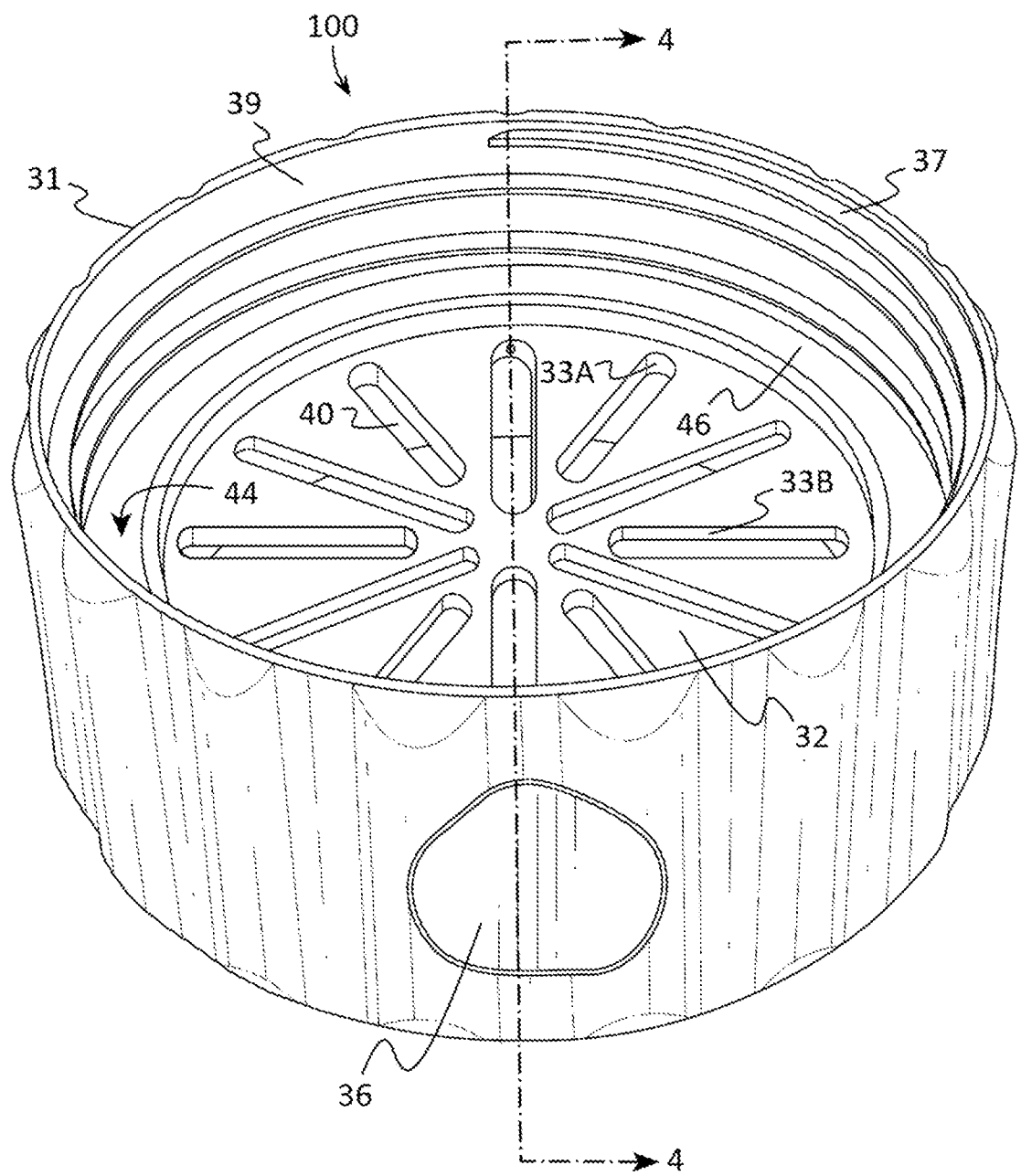
FIG. 3 shows a perspective view of another example of an immersion bioreactor device according to various embodiments described herein.
Figure 4:
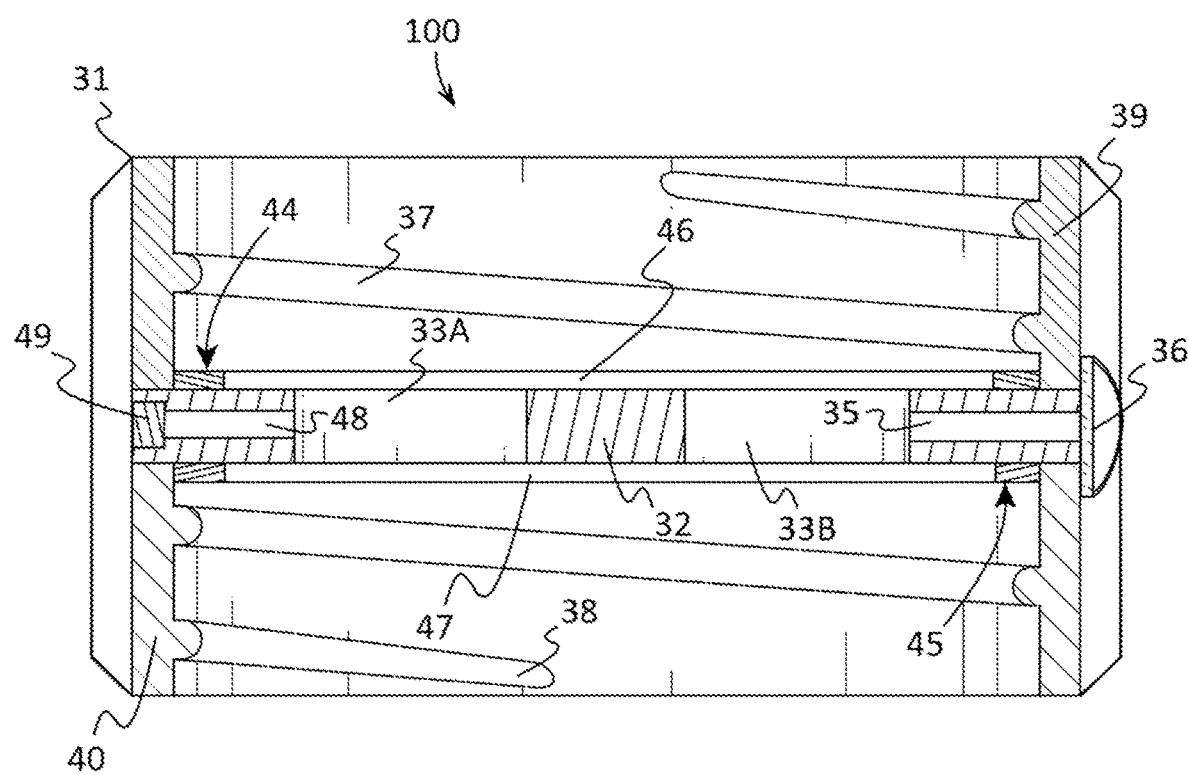
FIG. 4 depicts a sectional, through line 4-4 shown in FIG. 3, elevation view the example immersion bioreactor device of FIG. 3 according to various embodiments described herein.

For purposes of description herein, the terms "upper," "lower," "left," "right," "rear," "front," "side," "vertical," "horizontal," and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first," "second," etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new immersion bioreactor device is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIGS. 1-4 illustrate examples of an immersion bioreactor device ("the device") 100 according to various embodiments. Preferably, the device 100 may be used for the aseptic liquid culture of plants 200, obtaining liquid medium/exudates 300 from plants 200, fermentation under controlled conditions, etc. In some embodiments, the device 100 may comprise a first vessel 11, a second vessel 21, and a vessel coupler 31. The first vessel 11 may comprise a first cavity 12 and a first mouth 15 forming a first vessel aperture 13 in which the first vessel aperture 13 is in fluid communication with the first cavity 12. The second vessel 21 may comprise a second cavity 22 and a second mouth 25 forming a second vessel aperture 23 in which the second vessel aperture 23 is in fluid communication with the second cavity 22. The vessel coupler 31 may be configured to be removably coupled to both the first vessel 11 and second vessel 21, and the vessel coupler 31 may have a plate 32 positioned between a first sidewall 39 and a second sidewall 40. The first sidewall 39 may be configured to be removably coupled to the first mouth 15 of the first vessel 11 so that the first vessel aperture 13 is in fluid communication with the plate 32, and the second sidewall 40 may be configured to be removably coupled to the second mouth 25 of the second vessel 21 so that the second vessel aperture 23 is also in fluid communication with the plate 32. One or more coupler apertures 33A, 33B, may be disposed in the plate 32, and the coupler apertures 33A, 33B, may enable fluid communication between the vessel apertures 13, 23. Optionally, an adjustable vane disc 34 may govern the size of objects that may pass through the coupler apertures 33A, 33B, preferably by being sized to prevent particles of a desired size from passing through between the vessels 11, 21, through the coupler apertures 33A, 33B. The vessel coupler 31 may also include a vent 35 and a filter 36 which may allow pressure equalization with the environment that is exterior to the device 100. Optionally, the vane disc 34 may be or may comprise a mesh filter or screen. Optionally, a mesh screen may be placed between coupler apertures 33A, 33B, and vane disc 34. These allow for pressure equalization between the vessels 11, 21, in conjunction with a vent filter 36 for equalization with the ambient atmosphere.

The device 100 may comprise one or more vessels, such as a first vessel 11 and a second vessel 21, which may each comprise a cavity 12, 22, that may be sized and shaped to hold a desired volume of material. Generally, vessels 11, 21, and their respective cavities 12, 22, may be configured as containers of any size and shape. Each vessel 11, 21, may comprise a mouth 15, 25, which may form a vessel aperture 13, 23, that may grant access to its cavity 12, 22, and vessel apertures 13, 23, may also be configured in any size and shape. In preferred embodiments, vessels 11, 21, may be made from or may comprise a transparent or translucent material, such as polycarbonate plastic and glass. In further embodiments, a vessel 11, 21, may be made from or may comprise silicone rubber, metal and metal alloys, wood, or any other material which may be suitable for contacting liquids and that may also be food-grade or food-safe. In further embodiments, a vessel 11, 21, may be made from or may comprise an opaque material or a material that may filter one or more wavelengths of light that may pass into or through the vessel 11, 21. For example, the device 100 may comprise vessels 11, 21, made from opaque material which may enable the device 100 to be used for dark culture and fermentation.

Each vessel 11, 21, may be configured to be removably coupled to the vessel coupler 31 in a water-tight manner so that when a vessel 11, 21, is removably coupled to the vessel coupler 31, any liquid in a vessel cavity 12, 22, may be prevented from exiting the device 100. In preferred embodiments, a first vessel 11 may be configured to be removably coupled to a first side of the vessel coupler 31, and a second vessel 21 may be configured to be removably coupled to an opposing second side of the vessel coupler 31, such that the first vessel 11 and second vessel 21 are coupled to opposing sides of vessel coupler 31 as shown in FIG. 1. In other embodiments, a vessel coupler 31 may be configured to removably couple the vessels 11, 21, in any other orientation.

In preferred embodiments, one or both vessels 11, 21, may be removably coupled to the vessel coupler 31 via a threading. For example, the first sidewall 39 of the vessel coupler 31 may comprise a first thread 37, the second sidewall 40 of the vessel coupler 31 may comprise a second thread 38, and the mouth 15, 25, of each vessel 11, 21, may also comprise a thread 14, 24, which may enable the vessel coupler 31 and vessels 11, 21, to be removably coupled together by engaging the vessel threading 14, 24, to the vessel coupler threading 37, 38. It should be understood that threading may include any turn-to-lock type connection method in which a projection or thread is inserted and rotated into a pocket, channel, etc., such as which may be formed between two adjacent portions of a thread. In further embodiments, a vessel 11, 21, may be removably coupled to a vessel coupler 31 by being press fit or snap fit together, by one or more threaded fasteners, magnetic type fasteners, threaded type fasteners, sealable tongue and groove fasteners, snap fasteners, clip type fasteners, clasp type fasteners, ratchet type fasteners, a push-to-lock type connection method, a slide-to-lock type connection method or any other suitable temporary connection method as one reasonably skilled in the art could envision to serve the same function.

In some embodiments, the device 100 may comprise one or more gasket surfaces 44, 45, which may be used to form a water-tight seal between a vessel 11, 21, that may be removably coupled to a vessel coupler 31. For example, the device 100 may include a first gasket surface 44 that may be in contact with the first mouth 15 when the first vessel 11 is coupled to the vessel coupler 31, and the device 100 may comprise a second gasket surface 45 that may be in contact with the second mouth 25 when the second vessel 21 is coupled to the vessel coupler 31. In preferred embodiments, and as perhaps best shown in FIGS. 3 and 4, the device 100 may comprise one or more gaskets 46, 47, which may form one or more gasket surfaces 44, 45. For example, the device 100 may include a first gasket 46 that may be in contact with the plate 32 proximate to the first sidewall 39, and the first gasket 46 may have a first gasket surface 44 that may be in contact with the first mouth 15 when the first vessel 11 is coupled to the vessel coupler 31. Likewise, the device 100 may include a second gasket 47 that may be in contact with the plate 32 proximate to the second sidewall 40, and the second gasket 47 may have a second gasket surface 45 that may be in contact with the second mouth 25 when the second vessel 21 is coupled to the vessel coupler 31. In further preferred embodiments, and as perhaps best shown in FIGS. 5 and 6, a plate 32 may comprise one or more gasket surfaces 44, 45. For example, a plate 32 may comprise a resilient material that may form a first gasket surface 44 that may be proximate to the first sidewall 39, and the first gasket surface 44 may be in contact with the first mouth 15 when the first vessel 11 is coupled to the vessel coupler 31. Likewise, the plate 32 may include a second gasket surface 45 that may proximate to the second sidewall 40, and the second gasket surface 45 may be in contact with the second mouth 25 when the second vessel 21 is coupled to the vessel coupler 31.

Gaskets 46, 47, and gasket surfaces 44, 45, may be made of or may comprise a resilient material and which may be used to form a water-tight seal between a vessel 11, 21, that may be removably coupled to a vessel coupler 31. Example resilient materials include cork, natural and/or synthetic rubber material such as butyl rubber, latex rubber, silicone foam, silicone rubber, rubber foam, urethane foam, plastic foam, neoprene foam, latex foam rubber, polyurethane foam rubber, forms of the organic compound isoprene, Polyacrylate Rubber, Ethylene-acrylate Rubber, Polyester Urethane, flexible plastics, such as high-density polyethylene (HDPE), polyvinyl chloride (PVC), polypropylene (PP), Polystyrene (PS), Polycarbonate (PC), low density polyethylene (LDPE), or any other flexible material including combinations of materials. Optionally, a gasket 46, 47, may comprise a ring of resilient material which may surround and be coupled to a plastic, metal, or other suitable material mesh or screen material which may function to screen or filter solid materials of a desired size from passing through the vessel coupler 31 via its one or more coupler apertures 33A, 33B, and/or optional one or more disc apertures 41A, 41B.

The device 100 may comprise a vessel coupler 31 that may be configured to be removably coupled to both the first vessel 11 and second vessel 21. A vessel coupler 31 may be configured in any shape and size. In some embodiments, a vessel coupler 31 may comprise one or more sidewalls 39, 40, which may contact or otherwise be configured to contact portions of a vessel 11, 21, that may be proximate to the vessel aperture 13, 23, of the vessel 11, 21, such as the mouth 15, 25, of the vessel 11, 21, when it is coupled to the vessel coupler 31. In some embodiments, a vessel coupler 31 may have a plate 32 which may be coupled to and positioned between a first sidewall 39 and a second sidewall 40. Preferably, a plate 32 may be coupled to the sidewalls 39, 40, so that the plate 32 may be positioned between or otherwise may separate the vessel apertures 13, 23, from each other when the vessels 11, 21, are coupled to the vessel coupler 31.

The first sidewall 39 may be configured to be removably coupled to the first mouth 15 of the first vessel 11 so that the first vessel aperture 13 is in fluid communication with the plate 32, and the second sidewall 40 may be configured to be removably coupled to the second mouth 25 of the second vessel 21 so that the second vessel aperture 23 is also in fluid communication with the plate 32. In some embodiments, a sidewall 39, 40, may be configured to be removably coupled to one vessel 11, 21, while in further embodiments, a sidewall 39, 40, may be configured to be removably coupled to either vessel 11, 21.

The vessel coupler 31 may comprise one or more coupler apertures 33A, 33B, which may be disposed in the plate 32, and the coupler apertures 33A, 33B, may enable fluid communication between the vessel apertures 13, 23, when the vessels 11, 21, are coupled to the vessel coupler 31. Coupler apertures 33A, 33B, may be configured in any shape and size, such as the oval or generally elliptical "daisy" petal shape and pattern examples depicted in FIGS. 3 and 5.

A plate 32 may comprise any material or structure which may have one or more coupler apertures 33A, 33B, that may enable fluid communication through the plate 32. For example, a plate 32 may comprise a sheet of plastic, metal, wood, etc., having one or more coupler apertures 33A, 33B, drilled, cut, molded, or otherwise formed into the sheet of plastic, metal, wood, etc. As another example, a plate 32 may comprise a sheet of plastic, metal, or other suitable material mesh or screen material having a plurality of coupler apertures 33A, 33B, which may function to screen or filter solid materials of a desired size from passing through the plate 32.

Figure 5:
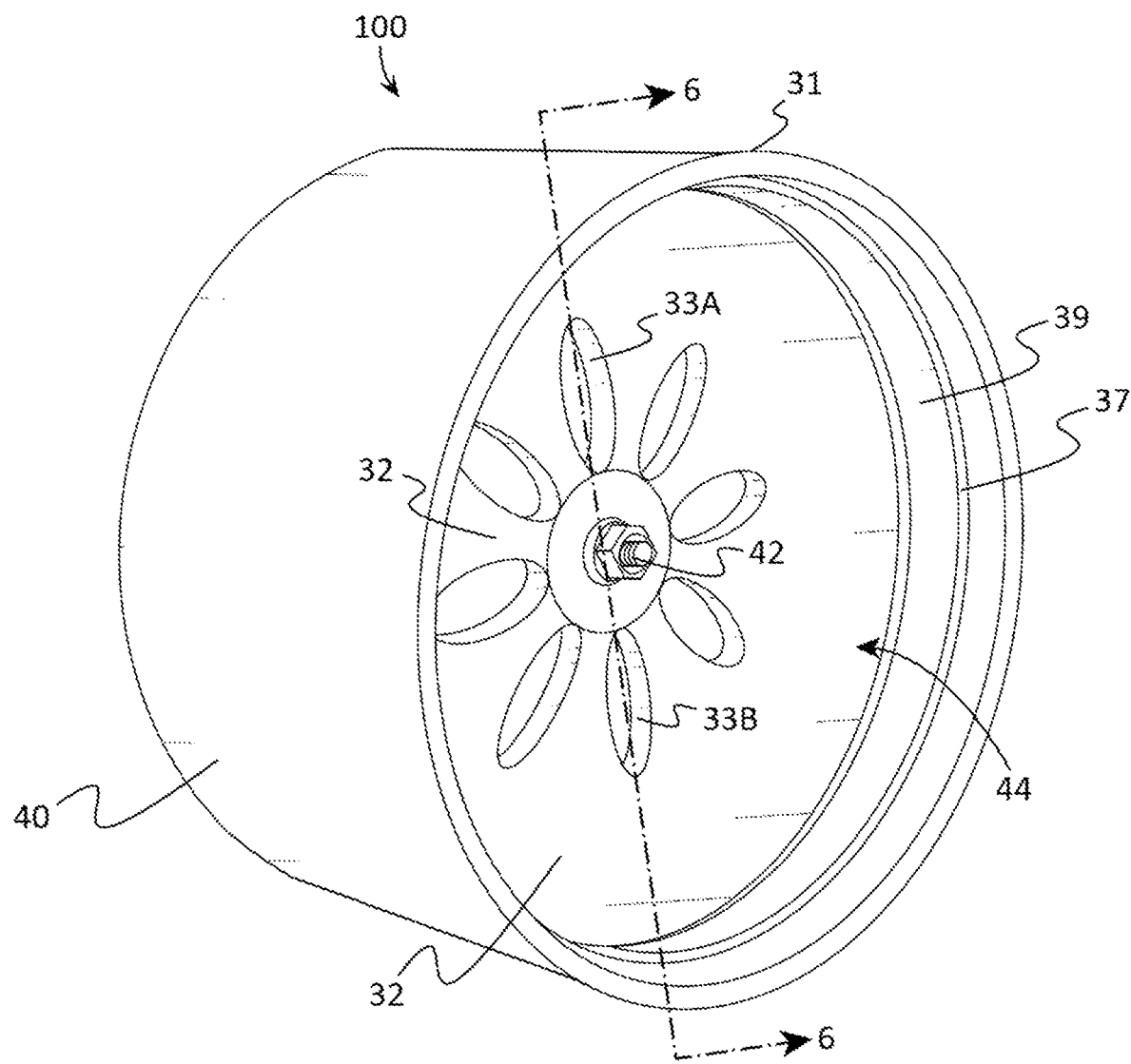
FIG. 5 illustrates a perspective view of a further example of an immersion bioreactor device according to various embodiments described herein.
Figure 6:
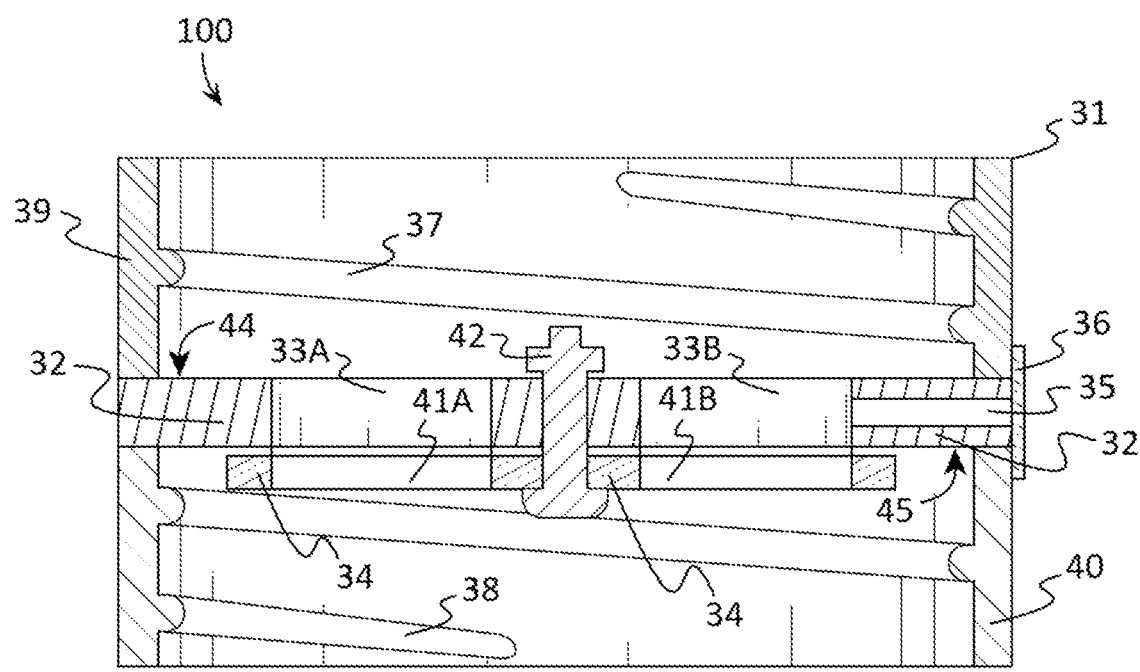
FIG. 6 shows a sectional, through line 6-6 shown in FIG. 5, elevation view of the example immersion bioreactor device of FIG. 5 according to various embodiments described herein.

In preferred embodiments, and as shown in FIGS. 5 and 6, the device 100 may be comprise a vane disc 34 which may be configured to enable the size of one or more of the coupler apertures 33A, 33B, to be adjustable in size so that the size of objects that may pass through the one or more coupler apertures 33A, 33B, may be increased, by increasing the size and/or number of coupler apertures 33A, 33B, and decreased, by decreasing the size and/or number of coupler apertures 33A, 33B. In further preferred embodiments, the device 100 may comprise a vane disc 34 which may govern the fluid communication provided by the coupler apertures 33A, 33B, by being configured to increase and decrease the size and/or number of coupler apertures 33A, 33B. A vane disc 34 may comprise one or more disc apertures 41A, 41B, which may enable fluid communication through the vane disc 34, and the disc apertures 41A, 41B, may be configured in any shape and size. Preferably, a vane disc 34 may be movably coupled to the plate 32 or other element of the vessel coupler 31, such as via one or more fasteners 42, so that the positioning of the vane disc 34, and therefore its disc apertures 41A, 41B, may be rotatable, and the positioning of the disc apertures 41A, 41B, may govern the size and/or number of coupler apertures 33A, 33B. By moving the vane disc 34 in a first direction, the disc apertures 41A, 41B, may be increasingly aligned with the one or more coupler apertures 33A, 33B, thereby increasing the size and/or number of coupler apertures 33A, 33B, so as to increase the fluid communication ability of the one or more coupler apertures 33A, 33B, and by moving the vane disc 34 in a second direction, the disc apertures 41A, 41B, may be increasingly un-aligned with the one or more coupler apertures 33A, 33B, thereby decreasing the size and/or number of coupler apertures 33A, 33B, so as to decrease the fluid communication ability of the one or more coupler apertures 33A, 33B. In further embodiments, the device 100 may comprise two or more plates 32 and/or vane discs 34 having apertures 33A, 33B, 41A, 41B, of differencing sizes which may be interchangeably coupled to the sidewall 39 or other element of the device 100 thereby governing the fluid communication provided by the coupler apertures 33A, 33B. In further embodiments, any other suitable method or device may be used to govern the size of one or more coupler apertures 33A, 33B, thereby governing the fluid communication provided by the coupler apertures 33A, 33B.

In some embodiments, the device 100 may comprise one or more vents 35 which may allow pressure equalization with the environment and may allow gas exchange with the atmosphere that is exterior to the device 100 and the cavities 12, 22, coupler aperture 33A, 33B, or other element of the device 100. In preferred embodiments, a vent 35 may be coupled to a coupler aperture 33A, 33B. For example, a vent 35 may extend through a sidewall 39, 40, and plate 32 to join with a coupler aperture 33A, 33B, although a vent 35 may be configured in any size and shape and in any location on the device 100.

In some embodiments, the device 100 may comprise a filter 36 that may be coupled to a vent 35 so that anything, such as gasses, passing through a vent 35 must also pass through the filter 36. Preferably, a filter 36 may comprise a microporosity filter element, such as an expanded polytetrafluoroethylene (ePTFE) membrane microporous films which are naturally hydrophobic and can be used as permeable water barriers for venting or breather filters. In further embodiments, a filter 36 may comprise any other type of filter or filtering material, and more preferably a type of filter or filtering material which may enable gas exchange with the external atmosphere, maintain equal to ambient pressure, and protect against contaminants entering or escaping the device 100.

In some embodiments, the device 100 may comprise an injection port 48 that enables gas and/or fluid withdrawal from and/or injection into the vessel coupler 31 or other element of the device 100. Preferably, a resilient membrane 49 may be coupled to an injection port 48 which may form a self-healing injection seal that may prevent gas and/or fluid withdrawal from and/or injection into the injection port 48. An injection port 48 may be configured to receive the needle of a hypodermic needle or syringe or other injection device which may be inserted through a resilient membrane 49 and which may enable the injection device to withdraw from and/or inject fluid or other material into the vessel coupler 31 or other element of the device 100 while still maintaining aseptic conditions within the device 100 after removal of an injection device from the resilient membrane 49.

An injection port 48 and a resilient membrane 49 may be configured in any size and shape. In some embodiments, an injection port 48 may extend through a sidewall 39, 40, and/or a plate 32, optionally to join with or be coupled to a coupler aperture 33A, 33B. In further embodiments, an injection port 48 and a resilient membrane 49 may be positioned anywhere on the device 100. A resilient membrane 49 may be made of or may comprise a resilient material, such as natural and/or synthetic rubber material such as butyl rubber, latex rubber, silicone foam, silicone rubber, rubber foam, urethane foam, plastic foam, neoprene foam, latex foam rubber, polyurethane foam rubber, forms of the organic compound isoprene, Polyacrylate Rubber, Ethylene-acrylate Rubber, Polyester Urethane, flexible plastics, such as high-density polyethylene (HDPE), polyvinyl chloride (PVC), polypropylene (PP), Polystyrene (PS), Polycarbonate (PC), low density polyethylene (LDPE), or any other flexible and resilient material including combinations of materials.

While some exemplary shapes and sizes have been provided for elements of the device 100, it should be understood to one of ordinary skill in the art that the vessels 11, 21, vessel coupler 31, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the device 100 may be made from or may comprise durable materials such as aluminum, steel, other metals and metal alloys, wood, hard rubbers, hard plastics, fiber reinforced plastics, carbon fiber, fiberglass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An immersion bioreactor device, the device comprising:
   a first vessel having a first cavity and a first mouth forming a first vessel aperture, the first vessel aperture in fluid communication with the first cavity;
   a second vessel having a second cavity and a second mouth forming a second vessel aperture, the second vessel aperture in fluid communication with the second cavity;
   a vessel coupler having a plate positioned between a first sidewall and a second sidewall, wherein the first sidewall is configured to be removably coupled to the first mouth of the first vessel so that the first vessel aperture is in fluid communication with the plate, and wherein the second sidewall is configured to be removably coupled to the second mouth of the second vessel so that the second vessel aperture is also in fluid communication with the plate;
   a plurality of coupler apertures disposed in the plate and arranged in a radial slot configuration, wherein the plurality of coupler apertures enables fluid communication between the vessel apertures; and
   a vent formed in the plate between the first sidewall and the second sidewall and the vent directly connected to at least one coupler aperture from the plurality of coupler apertures and configured to allow gas exchange between gas that is exterior to the device and the at least one coupler aperture.

2. The device of claim 1, wherein a filter is coupled to the vent, and wherein the filter is coupled to one of the first sidewall and the second sidewall.

3. The device of claim 2, wherein the filter comprises a microporosity filter element.

4. The device of claim 1, further comprising an injection port and a second coupler aperture, wherein the injection port is formed in the plate, and wherein the injection port is coupled to the exterior surface of the vessel coupler and to the second coupler aperture so that material injected into the injection port enters the second coupler aperture before entering one of the first cavity and the second cavity.

5. The device of claim 4, wherein a resilient membrane is coupled to the injection port.

6. The device of claim 1, wherein first sidewall is removably coupled to the first mouth via threading, and wherein the second sidewall is removably coupled to the second mouth via threading.

7. The device of claim 1, further comprising a first gasket surface that is in contact with the first mouth when the first vessel is coupled to the vessel coupler, and further comprising a second gasket surface that is in contact with the second mouth when the second vessel is coupled to the vessel coupler.

8. The device of claim 1, wherein the first vessel and second vessel are coupled to opposing sides of vessel coupler.

9. An immersion bioreactor device, the device comprising:
   a first vessel having a first cavity and a first mouth forming a first vessel aperture, the first vessel aperture in fluid communication with the first cavity;
   a second vessel having a second cavity and a second mouth forming a second vessel aperture, the second vessel aperture in fluid communication with the second cavity;
   a vessel coupler having a plate positioned between a first sidewall and a second sidewall, wherein the first sidewall is configured to be removably coupled to the first mouth of the first vessel so that the first vessel aperture is in fluid communication with the plate, and wherein the second sidewall is configured to be removably coupled to the second mouth of the second vessel so that the second vessel aperture is also in fluid communication with the plate;
   a plurality of coupler apertures disposed in the plate and arranged in a radial slot configuration, wherein the plurality of coupler apertures enables fluid communication between the vessel apertures;
   a vent formed in the plate between the first sidewall and the second sidewall and the vent directly connected to at least one coupler aperture from the plurality of coupler apertures and configured to allow gas exchange between gas that is exterior to the device and the at least one coupler aperture; and
   a vane disc movably coupled to the plate.

10. The device of claim 9, wherein a filter is coupled to the vent, and wherein the filter is coupled to one of the first sidewall and the second sidewall.

11. The device of claim 10, wherein the filter comprises a microporosity filter element.

12. The device of claim 9, further comprising an injection port and a second coupler aperture, wherein the injection port is formed in the plate, and wherein the injection port is coupled to the exterior surface of the vessel coupler and to the second coupler aperture so that material injected into the injection port enters the second coupler aperture before entering one of the first cavity and the second cavity.

13. The device of claim 12, wherein a resilient membrane is coupled to the injection port.

14. The device of claim 9, wherein first sidewall is removably coupled to the first mouth via threading, and wherein the second sidewall is removably coupled to the second mouth via threading.

15. The device of claim 9, further comprising a first gasket surface that is in contact with the first mouth when the first vessel is coupled to the vessel coupler, and further comprising a second gasket surface that is in contact with the second mouth when the second vessel is coupled to the vessel coupler.

16. The device of claim 9, wherein the first vessel and second vessel are coupled to opposing sides of vessel coupler.

\* \* \* \* \*